March 18, 1947. J. BATLLE 2,417,727
FOLDABLE GOLF BAG TRANSPORTING CART
Filed April 3, 1945 2 Sheets-Sheet 1

Inventor
John Batlle.

By Clarence A. O'Brien
and Harvey B. Jacobson
Attorneys

March 18, 1947.  J. BATLLE  2,417,727
FOLDABLE GOLF BAG TRANSPORTING CART
Filed April 3, 1945  2 Sheets-Sheet 2
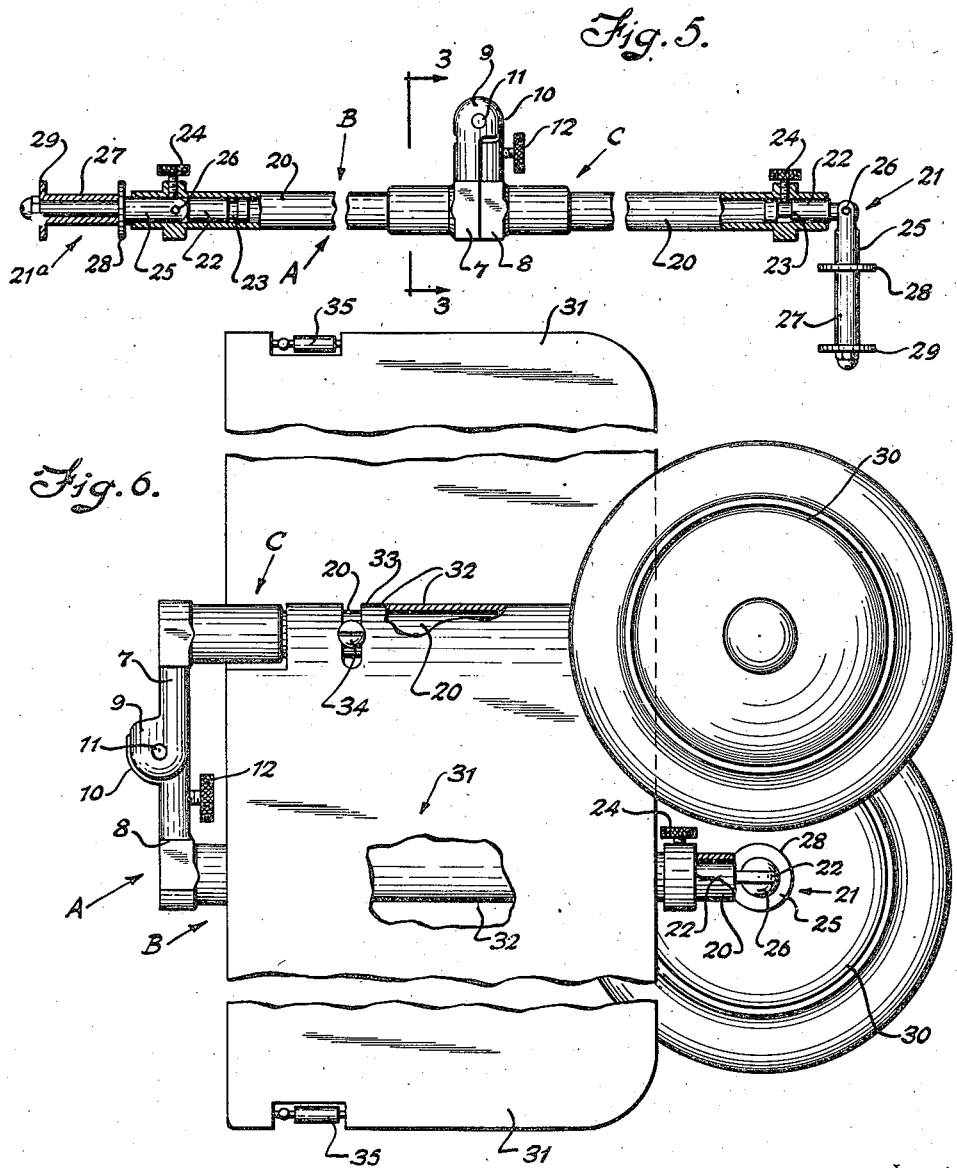
Inventor
John Batlle.
By Clarence A. O'Brien
and Harvey B. Jacobson
Attorneys Patented Mar. 18, 1947

2,417,727

UNITED STATES PATENT OFFICE 2,417,727

FOLDABLE GOLF BAG TRANSPORTING CART

John Batlle, Detroit, Mich.

Application April 3, 1945, Serial No. 586,369

9 Claims. (Cl. 280—36)

The present invention relates to an especially constructed, two-wheeled cart which is adapted to serve as a dummy caddie on a golf course, the same being suitably and appropriately fashioned to accommodate conventional golf bags.

So-called caddie carts and similar wheeled conveyances for use on golf courses are well known, the same having come into vogue rather recently. I mention this merely to bring out the fact that I do not presume that a two-wheeled cart for shoving and hauling a golf bag around the fairways is in any sense of the word new. In fact, it is important to understand this in order to appreciate that the principal purpose of the present invention is the provision of a collapsible or foldable cart. Therefore, the novelty resides in the specific construction of the cart which makes for compactness and convenience, allowing same to be transformed into a comparatively small package so that it can be transported in one's automobile to and from the golf course with ease and expediency.

More specifically, and from a structural point of view, novelty is predicated upon the wheel-supported frame which accommodates the single handle and shelf plates to support the bag, this being characterized by extensible and retractible wheel units, whereby to permit the wheels to be conveniently folded in relation to each other and the frame.

Stated with greater particularity, a further phase of novelty has to do with a frame wherein the aforementioned retractible and projectible sections constitute wheel mounts, these telescoping into hollow portions of the frame and said hollow portions constituting axle housings, as it were, the two sections of the frame being connected together by a special hinge which allows them to be swung into parallelism to make way for the folding of the entire cart into the smallest possible collapsed dimension.

Other features and advantages will become more readily apparent from the following description and the accompanying illustrative drawings.

In the drawings, wherein like numerals are employed to designate like parts throughout the same:

Figure 5 is a view partly in section and partly in elevation of the frame with the extensible axle units or so-called wheel mounts.

Figure 6 is a view with parts in section and elevation showing the complete structure with the parts in the relationship they assume when the cart is folded and ready to be transported to or from the golf course in an automobile, for example, in the trunk of the automobile.

Figure 4:
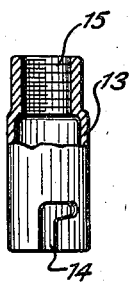
Figure 4 is a view partly in section and partly in elevation of a combined coupling and socket member or sleeve.

Referring now to the drawings by distinguishing reference numerals, attention is directed first to Figure 5, wherein the reference letter A denotes, as a unitary structure, the so-called frame, this being the foundation about which the entire assembly is built. This frame is actually made up of two main companion, as well as substantially duplicate, sections B and C. At their inner ends the sections are provided with mating abutments 7 and 8, these being provided with lateral extensions having coacting interfitting terminals 9 and 10 hingedly connected together, as at 11. These parts form a sort of a rule joint. That is to say, when the abutments are together, as shown in Figure 5, the sections B and C are in alignment, which is the position they assume when set up for use. The abutment 8 is provided with a fastening screw having a knurled knob or finger grip 12. A sleeve 13, of the type seen in Figure 4, is adapted to fit down over the abutment extensions so as to enclose the same and to assume the position seen in Figures 1 and 2. A bayonet slot 14 coacts with the stem of the screw and the head of the screw binds the sleeve in place, the upper end of the sleeve projecting beyond the abutment extensions and being internally screw-threaded to form a socket 15, this to accommodate the threaded inner end 16 on the long limb 17 of the L-shaped handle. The shorter limb 18 provides the handle proper. Incidentally, and in practice, suitable wings or brackets 19 will be provided on the handle or shaft portion 17 to permit the golf bag (not shown) to be strapped thereto. It is possible to detach bodily the handle (parts 16, 17 and 18) from the socket 15, leaving the sleeve 14 in place, or the entire sleeve 13 can be removed from the abutment extensions by loosening up the binding screw 12, the sleeve and handle coming off as one unit.

The sections B and C include a tubular outer portion 20 which constitutes what may be conveniently referred to as an axle housing. That is to say, this housing serves to house or enclose the extensible and projectible wheel mount or axle unit 21. The part 21 is actually made up of an inner stub shank 22 having an annular groove 23 into which a set screw 24 projects when the unit is pulled out and partly folded into L-shaped form, as seen in Figure 5. The axle section 25 is hingedly connected, as at 26, to the stub section, and this section 25 serves to accommodate a spool including a hub 27 with flanged heads 28 and 29. The spool serves to accommodate the rubber-tired wheel 30, as is shown in the drawings.

In Figure 5, the spool is shown in elevation at the right and in section at the left, in order to bring out the construction and arrangement of parts. Also, the unit 21 to the right, which corresponds to the unit 21a at the left, is folded into L-shaped form, that is, the form which the parts take when the wheel is collapsed, as shown in Figure 6. But, the unit 21a at the left is shown in the position it takes when the wheel is set up for use, as brought out for example in Figures 1 and 2. In other words, this one view will serve the multiple purpose of illustrating all of the details and also bringing out the functional association thereof in different relationships.

Figure 1:
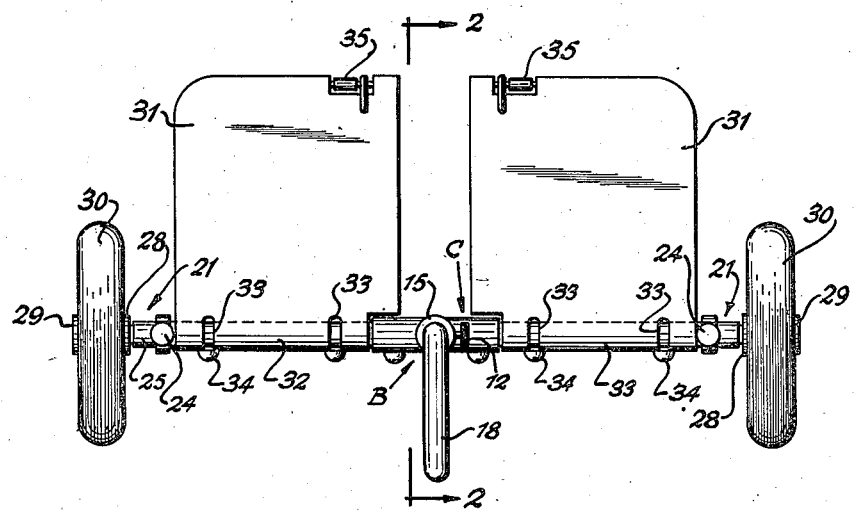
Figure 1 is a top plan view of a so-called two-wheeled collapsible caddie cart constructed in accordance with the principles of the present invention.
Figure 2:
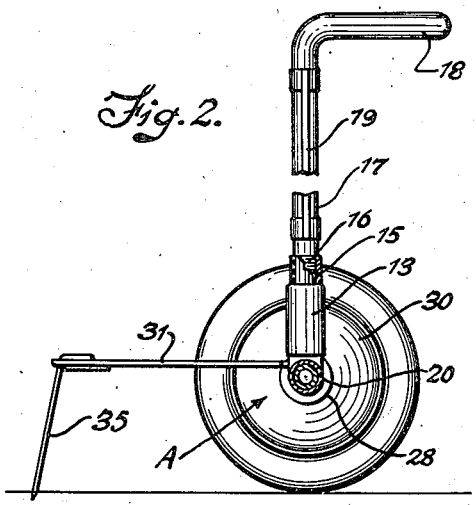
Figure 2 is a central vertical view taken approximately on the plane of the line 2—2 of Figure 1, looking in the direction of the arrows.
Figure 3:
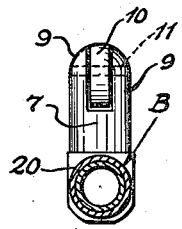
Figure 3 is a section taken on the plane of the line 3—3 of Figure 5.

I now call attention to the rectangular plates which serve as the supporting shelves for the base of the bag when the cart is set up for use. Each is the same in construction, and a description of one will suffice for both, that is to say, each plate is denoted by the numeral 31 and is adapted to occupy a horizontal position when in use, as shown in Figures 1 and 2. The inner end is "curled" into an appropriate attaching flange 32, and this is provided with longitudinally spaced slots 33 fastened to the frame by set screws 34. It is necessary to shift the plates over to proper position in order to take the overlapping relation seen in Figure 6 when the entire cart is folded. The slots and set screws 33 and 34 provide for this. The outer ends of the shelves or plates are provided with pivoted legs which serve as props 35 and thus it is possible to support the cart in the substantially perpendicular bag-supporting position seen in Figure 2. This makes it self-sustaining so that one may have easy access to the clubs in the bag, after which the cart can be again tilted to the desired angle and shoved or dragged about the fairways in the usual manner.

Novelty is predicated upon a sectional foldable frame structure with wheels which are also foldable in relation to the sections of the frame structure, a knock-down handle arrangement, and adjustable plates serving as shelves, all of the parts being carefully chosen and structurally coordinated to make for compactness and convenient arrangement thereof. It is believed that the construction, from the drawings and description, is sufficiently evident to acquaint the average reader with the old and new features involved.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A golf bag caddie cart of the class described comprising a frame composed of companion foldable sections, wheels foldably mounted on the outer end of the respective sections, and push-pull handle means connected to said frame, said handle means being bodily detachable, and plates shiftably mounted on the frame sections.

2. A golf bag caddie cart of the class described comprising a frame composed of companion foldable sections, wheels foldably mounted on the outer end of the respective sections, and push-pull handle means connected to said frame, said handle means being bodily detachable, and plates shiftably mounted on the frame sections, said plates constituting bag-supporting shelves and being provided with foldable supporting legs.

3. As a component part of a caddie cart of the class described, a frame embodying tubular end portions, said end portions constituting sheath-like axle housings, and a projectible and retractible axle unit telescopically mounted in each axle housing, each unit including a foldable axle section provided with a spool-like hub to accommodate a wheel.

4. As a component part of a caddie cart assemblage of the class described, an axle unit comprising a stub shank adapted to be slidably mounted in an axle housing, an axle section hingedly connected to the outer end of said shank, and a flanged spool on said axle section constituting a hub for a wheel.

5. As a part of a caddie cart of the class described, a frame comprising a pair of substantially duplicate sections, said sections having wheel mounts on their outer ends, said wheel mounts being of a collapsible type, the inner ends of said sections having abutments, said abutments being hingedly connected together, a sleeve fitting over the abutments when they are in abutting relationship.

6. As a part of a caddie cart of the class described, a frame comprising a pair of substantially duplicate sections, said sections having wheel mounts on their outer ends, said wheel mounts being of a collapsible type, the inner ends of said sections having abutments, said abutments being hingedly connected together, a sleeve fitting over the abutments when they are in abutting relationship, and said sleeve having a socket, said socket being adapted to accommodate a detachable handle.

7. As a component part of a caddie cart of the class described, a frame comprising a pair of substantially duplicate sections, said sections having wheel mounts on their outer ends, said wheel mounts being of a collapsible type, the inner ends of said sections having abutments, said abutments being hingedly connected together, a sleeve fitting over the abutments when they are in abutting relationship, said sleeve having a socket, said socket being adapted to accommodate a detachable handle, and a pair of complemental plates shiftably mounted on said frame sections, said plates being substantially rectangular in general form, flat and constituting bag accommodation and supporting shelves and being foldable in conjunction with the legs when not in use.

8. A golf bag caddie cart of the class described comprising a frame composed of companion foldable sections, wheels foldably mounted on the outer ends of the respective sections, handle means connected to said frame, and shelf forming golf bag accommodation and supporting plates shiftably mounted on said frame sections.

9. In a foldable golf bag transporting cart of the class described, a frame comprising a pair of substantially duplicate sections, said sections embodying tubular end portions, said end portions constituting sheath-like axle housings, projectible and retractible axle and wheel units, each axle unit comprising a stub-shank slidably mounted in the adjacent axle housing, an axle section hingedly connected to the outer end of said shank, a flanged spool on said axle section constituting a hub for a wheel, a wheel mounted on said hub, means on the tubular end portion to hold the axle unit in inwardly disposed retracted position, handle means provided on said frame for toting same about, and plate means on said frame to accommodate and support the golf bag.

JOHN BATLLE.

REFERENCES CITED

The following references are of record in the file of this patent:

UNITED STATES PATENTS

| Number | Name | Date |
|---|---|---|
| 1,652,190 | Wills | Dec. 13, 1927 |
| 806,097 | Baumann | Dec. 5, 1905 |
| 153,034 | Arnold et al. | July 14, 1874 |
| 2,236,053 | Caron | Mar. 25, 1941 |
| 2,335,579 | Chamberlin et al. | Nov. 30, 1943 |

FOREIGN PATENTS

| Number | Country | Date |
|---|---|---|
| 169,200 | British | Sept. 19, 1921 |
| 25,897 | Australian | Mar. 28, 1930 |